United States Patent
Kedia et al.

(10) Patent No.: US 10,956,042 B2
(45) Date of Patent: Mar. 23, 2021

(54) TIERING DATA COMPRESSION WITHIN A STORAGE SYSTEM

(71) Applicant: International Business Machines Corporation, Armonk, NY (US)

(72) Inventors: Rishika Kedia, Bangalore (IN); Anbazhagan Mani, Bangalore (IN); Ranjith Rajagopalan Nair, Bangalore (IN); Subramaniyan Nallasivam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 15/833,851

(22) Filed: Dec. 6, 2017

(65) Prior Publication Data
US 2019/0171370 A1   Jun. 6, 2019

(51) Int. Cl.
*G06F 3/06* (2006.01)

(52) U.S. Cl.
CPC ............ *G06F 3/0608* (2013.01); *G06F 3/061* (2013.01); *G06F 3/067* (2013.01); *G06F 3/0619* (2013.01); *G06F 3/0649* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| 7,424,585 | B2 | 9/2008 | Takahashi et al. | |
| 8,886,901 | B1* | 11/2014 | Hsu | G06F 3/0647 711/161 |
| 8,909,829 | B1* | 12/2014 | Thangapalam | G06F 3/0604 710/18 |
| 9,244,618 | B1 | 1/2016 | Martin et al. | |
| 9,355,112 | B1* | 5/2016 | Armangau | G06F 16/1774 |
| 10,203,897 | B1* | 2/2019 | Cheah | G06F 3/0638 |
| 2009/0204650 | A1* | 8/2009 | Wong | G06F 16/1744 |
| 2013/0275653 | A1* | 10/2013 | Ranade | G06F 3/0605 711/103 |
| 2014/0207745 | A1 | 7/2014 | Groseclose et al. | |
| 2016/0011816 | A1* | 1/2016 | Aizman | G06F 3/0604 711/117 |
| 2016/0328179 | A1* | 11/2016 | Quinn | G06F 3/0611 |
| 2017/0199678 | A1* | 7/2017 | Subramanian | G06F 3/0611 |
| 2018/0314449 | A1* | 11/2018 | Kondapalli | G06F 3/0631 |
| 2018/0321858 | A1* | 11/2018 | Hutchison | G06F 3/0611 |
| 2019/0050417 | A1* | 2/2019 | Ellis | G06F 16/1748 |

* cited by examiner

*Primary Examiner* — Charles Rones
*Assistant Examiner* — Ryan Dare
(74) *Attorney, Agent, or Firm* — Zilka-Kotab, P.C.

(57) ABSTRACT

A computer-implemented method according to one embodiment includes identifying data stored within a first virtual storage tier of a storage system, analyzing one or more characteristics of the data, and conditionally transferring the data from the first virtual storage tier of the storage system to a second virtual storage tier of the storage system, based on the analyzing.

17 Claims, 6 Drawing Sheets

TIERING DATA COMPRESSION WITHIN A STORAGE SYSTEM

BACKGROUND

The present invention relates to data storage, and more specifically, this invention relates to determining a storage of data within a storage system based on data compression options available within the storage system.

Data storage is an essential part of modern computing practices. Data compression is often used to reduce an amount of storage space required for stored data within storage systems. However, current applications of compression are static and do not account for characteristic changes of stored data over time.

SUMMARY

A computer-implemented method according to one embodiment includes identifying data stored within a first virtual storage tier of a storage system, analyzing one or more characteristics of the data, and conditionally transferring the data from the first virtual storage tier of the storage system to a second virtual storage tier of the storage system, based on the analyzing.

According to another embodiment, a computer program product for tiering data compression within a storage system comprises a computer readable storage medium having program instructions embodied therewith where the computer readable storage medium is not a transitory signal per se, and where the program instructions are executable by a processor to cause the processor to perform a method comprising identifying data stored within a first virtual storage tier of the storage system, utilizing the processor, analyzing one or more characteristics of the data, utilizing the processor, and conditionally transferring the data from the first virtual storage tier of the storage system to a second virtual storage tier of the storage system, based on the analyzing, utilizing the processor.

A system according to another embodiment includes a processor, and logic integrated with the processor, executable by the processor, or integrated with and executable by the processor, where the logic is configured to identify data stored within a first virtual storage tier of a storage system, analyze one or more characteristics of the data, and conditionally transfer the data from the first virtual storage tier of the storage system to a second virtual storage tier of the storage system, based on the analyzing.

Other aspects and embodiments of the present invention will become apparent from the following detailed description, which, when taken in conjunction with the drawings, illustrate by way of example the principles of the invention.

DETAILED DESCRIPTION

Figure 1:
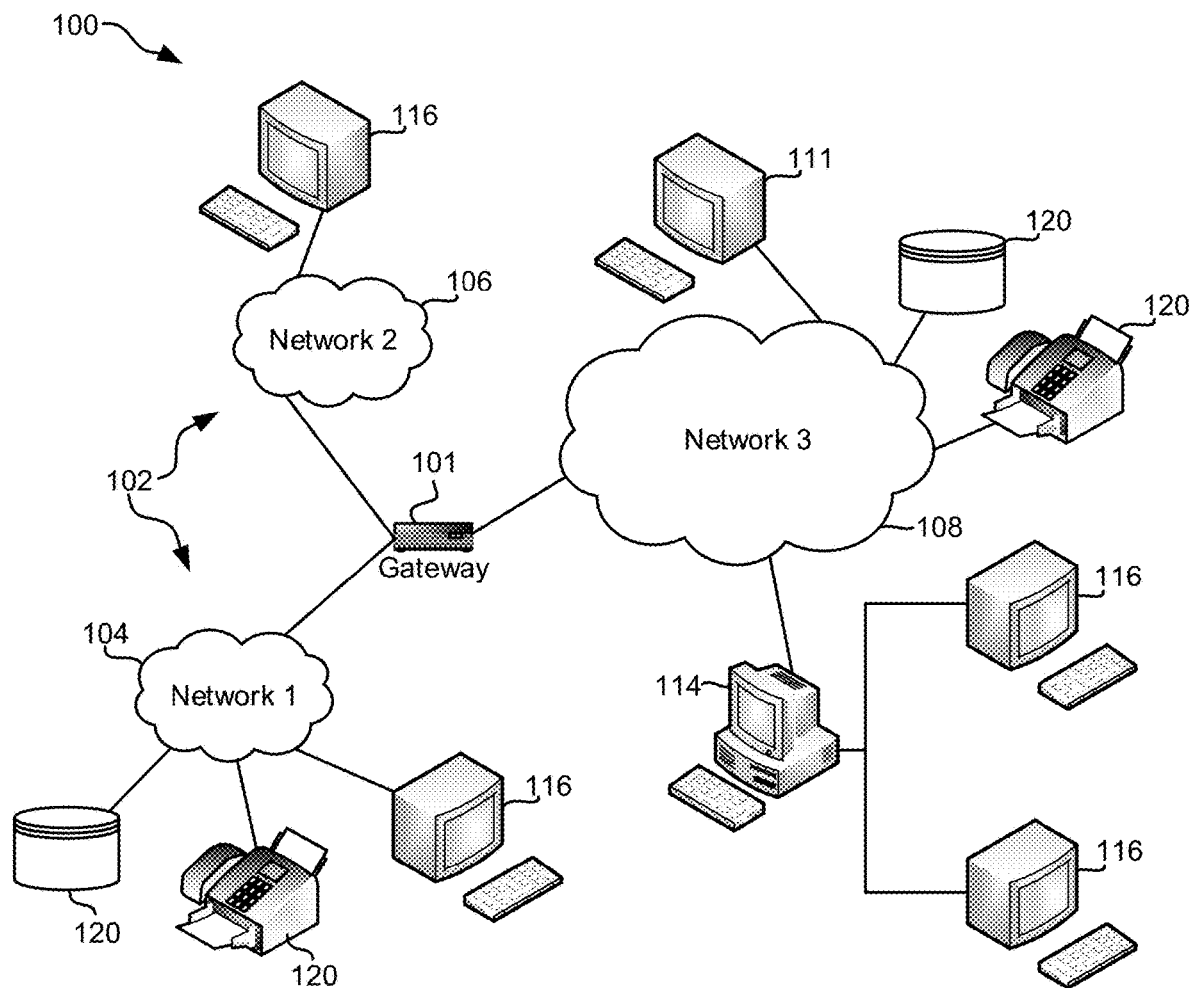
FIG. 1 illustrates a network architecture, in accordance with one embodiment.

The following description discloses several preferred embodiments of systems, methods and computer program products for tiering data compression within a storage system. Various embodiments provide a method to create a plurality of virtual storage tiers within physical storage tiers of a storage system, and move data between the virtual storage tiers when characteristics of the data meet one or more predetermined criteria.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for tiering data compression within a storage system.

In one general embodiment, a computer-implemented method includes identifying data stored within a first virtual storage tier of a storage system, analyzing one or more characteristics of the data, and conditionally transferring the data from the first virtual storage tier of the storage system to a second virtual storage tier of the storage system, based on the analyzing.

In another general embodiment, a computer program product for tiering data compression within a storage system comprises a computer readable storage medium having program instructions embodied therewith where the computer readable storage medium is not a transitory signal per se, and where the program instructions are executable by a processor to cause the processor to perform a method comprising identifying data stored within a first virtual storage tier of the storage system, utilizing the processor, analyzing one or more characteristics of the data, utilizing the processor, and conditionally transferring the data from the first virtual storage tier of the storage system to a second virtual storage tier of the storage system, based on the analyzing, utilizing the processor.

In another general embodiment, a system includes a processor, and logic integrated with the processor, executable by the processor, or integrated with and executable by the processor, where the logic is configured to identify data stored within a first virtual storage tier of a storage system, analyze one or more characteristics of the data, and conditionally transfer the data from the first virtual storage tier of the storage system to a second virtual storage tier of the storage system, based on the analyzing.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
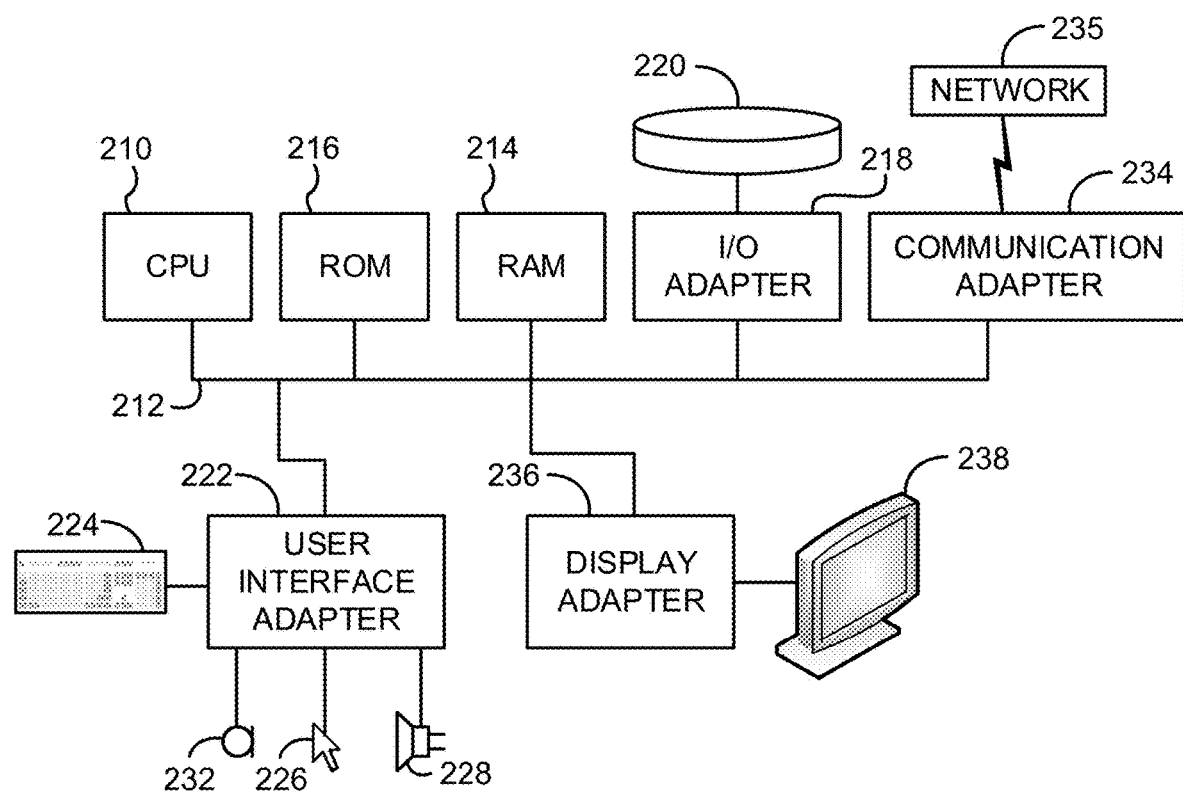
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
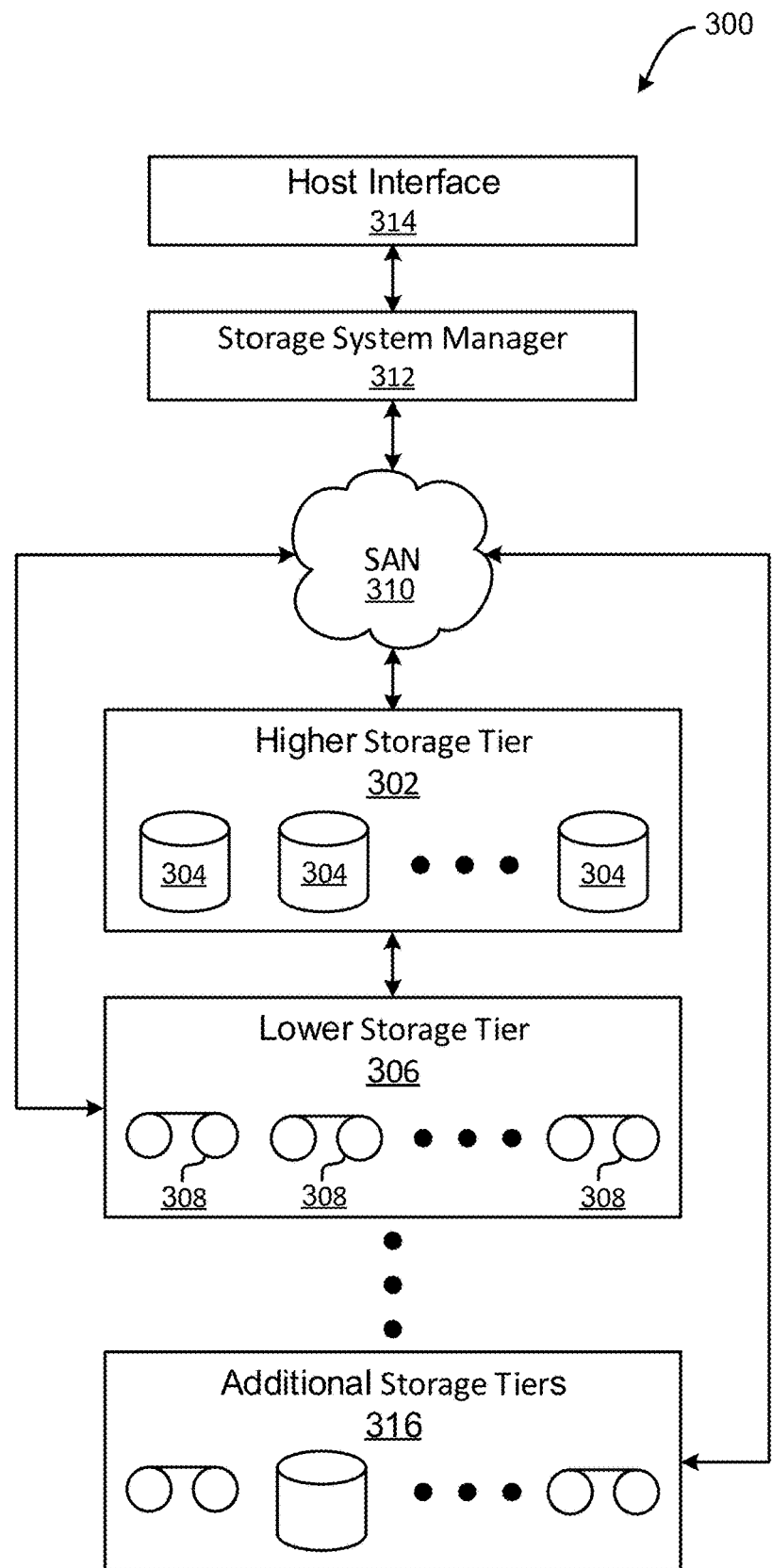
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
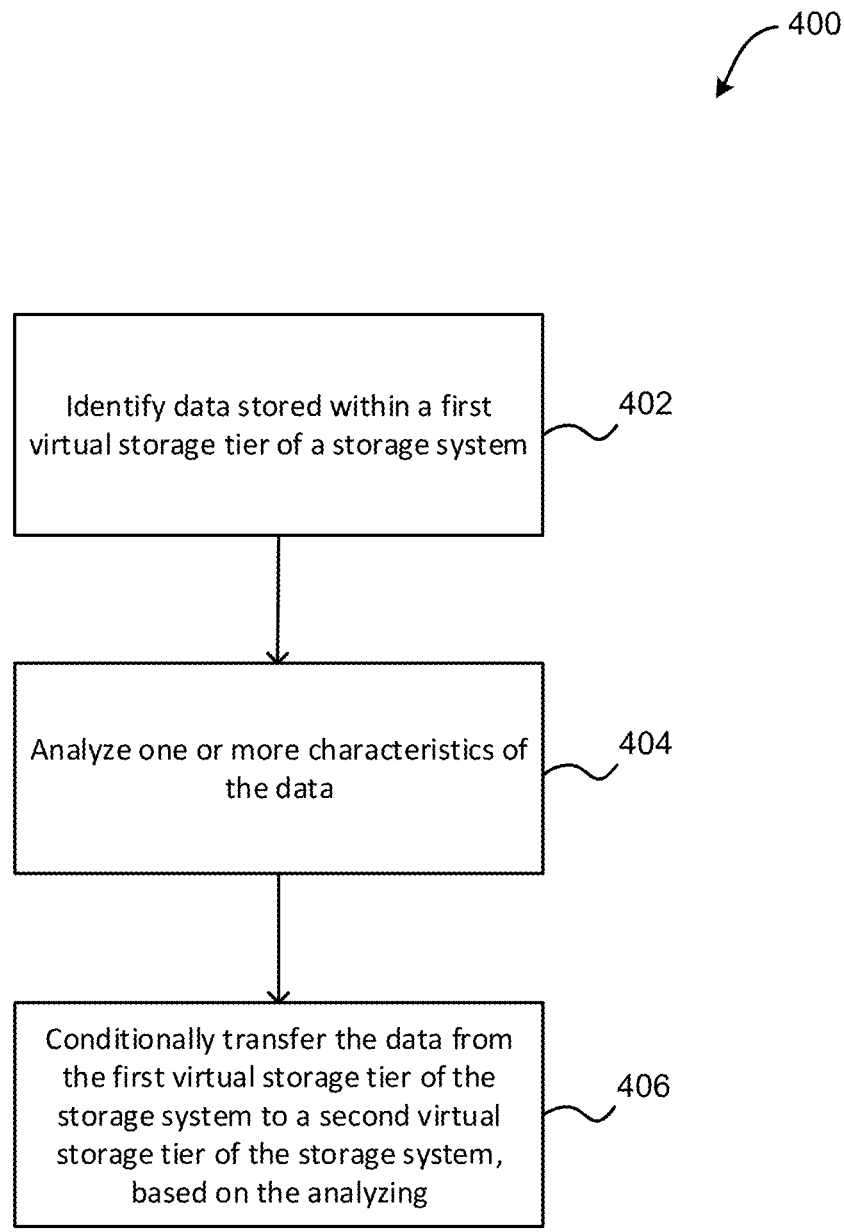
FIG. 4 illustrates a method for tiering data compression within a storage system, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where data stored within a first virtual storage tier of a storage system is identified. In one embodiment, the data may include any data capable of being stored within storage media of the storage system (e.g., files, objects, etc.). In another embodiment, the storage system may include a system including a plurality of different hardware storage devices (e.g., hard disk drives (HDDs), flash drives, tape drives, etc.).

Additionally, in one embodiment, the first virtual storage tier may be one of a plurality of virtual storage tiers within the storage system. For example, each of the plurality of virtual storage tiers may include a virtual storage tier within the storage system. In another embodiment, one or more virtual storage tiers may be located within a single physical storage tier of the storage system. For example, the physical storage tier may include a predetermined storage type, storage medium, etc.

In another example, the storage system may have a plurality of different storage types (flash storage, HDD storage, tape storage, etc.). In one embodiment, each storage type may be represented as a single physical storage tier within the storage system. For example, each physical storage tier may be defined only based on physical characteristics of storage within that defined tier. In another embodiment, one or more virtual storage tiers may be created virtually within a single physical storage tier.

Further, in one embodiment, each of the plurality of virtual storage tiers within a single physical storage tier may be associated with a unique compression algorithm used to compress and decompress data during storage within the physical storage tier. Accordingly, one virtual storage tier within the single physical storage tier may use a different compression algorithm than another virtual storage tier in the same physical storage tier. Such compression algorithms may be of known type. For example, the compression algorithm may include an algorithm used to compress and decompress data stored within the associated virtual storage tier. In another example, when data is moved to a virtual storage tier, it may be compressed using the compression algorithm associated with that virtual storage tier. In yet another example, when data is retrieved from the virtual storage tier, it may be decompressed using the compression algorithm associated with that virtual storage tier. In still another example, each compression algorithm may have characteristics including an associated compression ratio, compression speed, and decompression speed. In another embodiment, these characteristics, as well as an indication of the compression algorithm used, may be stored in association with the virtual storage tier (e.g., as metadata, etc.).

Further still, in one embodiment, the data may be identified in response to a request for the data (e.g., a read request, write request, modify request, etc.). In another embodiment, the data may be identified automatically (e.g., as part of a scheduled review of stored data, etc.). In yet another embodiment, the data may be assigned to the first virtual storage tier. For example, the data may be assigned to the first virtual storage tier based on an identification of one or more characteristics of the data at the time the data is stored within the storage system.

Further still, method 400 may proceed with operation 404, where one or more characteristics of the data are analyzed. In one embodiment, the characteristics may include a current age of the data (e.g., an amount of time since the data was created). In another embodiment, the characteristics may include a current temperature of the data (e.g., an age of the data, such as an amount of time since the data was last accessed). In yet another embodiment, the characteristics may include a current type of the data (e.g., whether the data is image data, audio data, database data, etc.).

In addition, in one embodiment, the characteristics may include a current security level of the data (e.g., an amount and/or type of encryption used to encrypt the data, a predetermined security value for the data, etc.). In another embodiment, the characteristics may include a current importance of the data (e.g., a predetermined value assigned to the data based on a value placed on the data by one or more users). In yet another embodiment, the characteristics may include a domain of the data (e.g., whether the data is medical data, accounting data, engineering data, etc.).

Furthermore, in one embodiment, the analyzing may include determining whether the one or more characteristics of the data have changed since the data was assigned to the first virtual storage tier. For example, the analyzing may include determining whether an age of the data has increased, whether a temperature of the data has increased or decreased, whether an importance or security level of the data has changed, etc.

Further still, in one embodiment, the analyzing may include determining a virtual storage tier within the storage system that has storage criteria matching the one or more characteristics of the data. For example, the determining of the virtual storage tier may be performed in response to determining that the one or more characteristics of the data have changed since the data was assigned to the first virtual storage tier. In another embodiment, only a single virtual storage tier within the storage system may have storage criteria matching the one or more characteristics of the data. For example, the one or more characteristics of the data may not match more than one instance of storage criteria associated with a single virtual storage tier.

Also, in one embodiment, each virtual storage tier may have storage criteria indicating characteristics of data to be stored within the virtual storage tier. For example, each virtual storage tier may have associated storage criteria indicating that data of a predetermined age, temperature, importance, and/or security level are to be stored within the virtual storage tier. In another embodiment, the storage criteria may indicate a specific value or a predetermined range of values for one or more characteristics of data to be stored. In yet another embodiment, the values may be predetermined by one or more users, may be dynamically determined via one or more learning algorithms, etc.

Additionally, in one embodiment, the storage criteria may be stored in a lookup table, database, etc. and may be referenced during the analyzing. For example, the storage criteria for a virtual storage tier may be linked to an identifier of the virtual storage tier. In another example, the one or more characteristics of the data may be compared to the stored storage criteria.

In addition, method 400 may proceed with operation 406, where the data is conditionally transferred from the first virtual storage tier of the storage system to a second virtual storage tier of the storage system, based on the analyzing. In one embodiment, the data may not be transferred from the first virtual storage tier to the second virtual storage tier in response to determining that the one or more characteristics of the data have not changed since the data was assigned to the first virtual storage tier. In another embodiment, the data may not be transferred from the first virtual storage tier to the second virtual storage tier in response to determining that the first virtual storage tier has storage criteria matching the one or more characteristics of the data.

Further still, in one embodiment, the data may be transferred from the first virtual storage tier to the second virtual storage tier in response to determining that the second virtual storage tier has storage criteria matching the one or more characteristics of the data. For example, the data may be immediately transferred from the first virtual storage tier to the second virtual storage tier. In another example, the transferring may include decompressing the data, utilizing the compression algorithm associated with the first virtual storage tier, and recompressing the data, utilizing the compression algorithm associated with the second virtual storage tier.

Also, in one embodiment, the transferring may include moving the data from a first physical storage tier to a second physical storage tier within the storage system. For example, if the first virtual storage tier is located within the first physical storage tier, and the second virtual storage tier is located within the second physical storage tier, the data may be moved from the first physical storage tier to the second physical storage tier. In another embodiment, the data may remain within a single physical storage tier during the transfer. For example, if the first virtual storage tier is located within the first physical storage tier, and the second virtual storage tier is also located within the first physical storage tier, the data may not be moved from the first physical storage tier.

In addition, in one embodiment, the data may be scheduled to be transferred from the first virtual storage tier to the second virtual storage tier. For example, the data may be flagged, and the data may be transferred when a predetermined amount of data within the storage system is flagged. In another example, the flagged data may be transferred when the data is next accessed, requested, etc.

For example, the data may be transferred in response to a read request, write request, modify request, etc. In another example, the data may be automatically decompressed using the compression algorithm associated with the first virtual storage tier when accessed. In yet another example, the data may be moved to the second virtual storage tier and may be automatically recompressed using the compression algorithm associated with the second virtual storage tier when the access is completed.

Furthermore, in one embodiment, metadata associated with the data may include an indication of the current virtual storage tier. In another embodiment, this metadata may be updated when the data moved from one virtual storage tier to another.

In one example, as a temperature of the data decreases (e.g., moved from "warm" to "cold," etc.), the data may be decompressed in the first virtual storage tier and moved to/recompressed in the second virtual storage tier. For instance, the first virtual storage tier may use a compression algorithm having a lower compression ratio, a higher compression speed, and a higher decompression speed than the second virtual storage tier. In another example, the data may be transferred from the first virtual storage tier to the second virtual storage tier in response to determining that a temperature of the data has decreased.

In this way, colder data may be stored in a virtual storage tier that has a higher compression ratio than a previous virtual storage tier (which may result in a smaller size of compressed data than in a previous virtual storage tier and may minimize an amount of stored data), but that has slower compression and decompression speeds when compared to the previous virtual storage tier (which may increase an access time for the data).

Further still, in another example, as a temperature of the data increases (e.g., moved from "cold" to "hot," etc.), the data may be decompressed in the second virtual storage tier and moved to/recompressed in the first virtual storage tier. In this way, warmer data may be stored in a virtual storage tier that has a lower compression ratio than a previous virtual storage tier (which may result in a larger size of compressed data than in a previous virtual storage tier), but that has faster compression and decompression speeds when compared to the previous virtual storage tier (which may minimize latency and reduce an access time for the data). In yet another example, as an age of the data increases, the data may be decompressed in the first virtual storage tier and recompressed in the second virtual storage tier.

Figure 5:
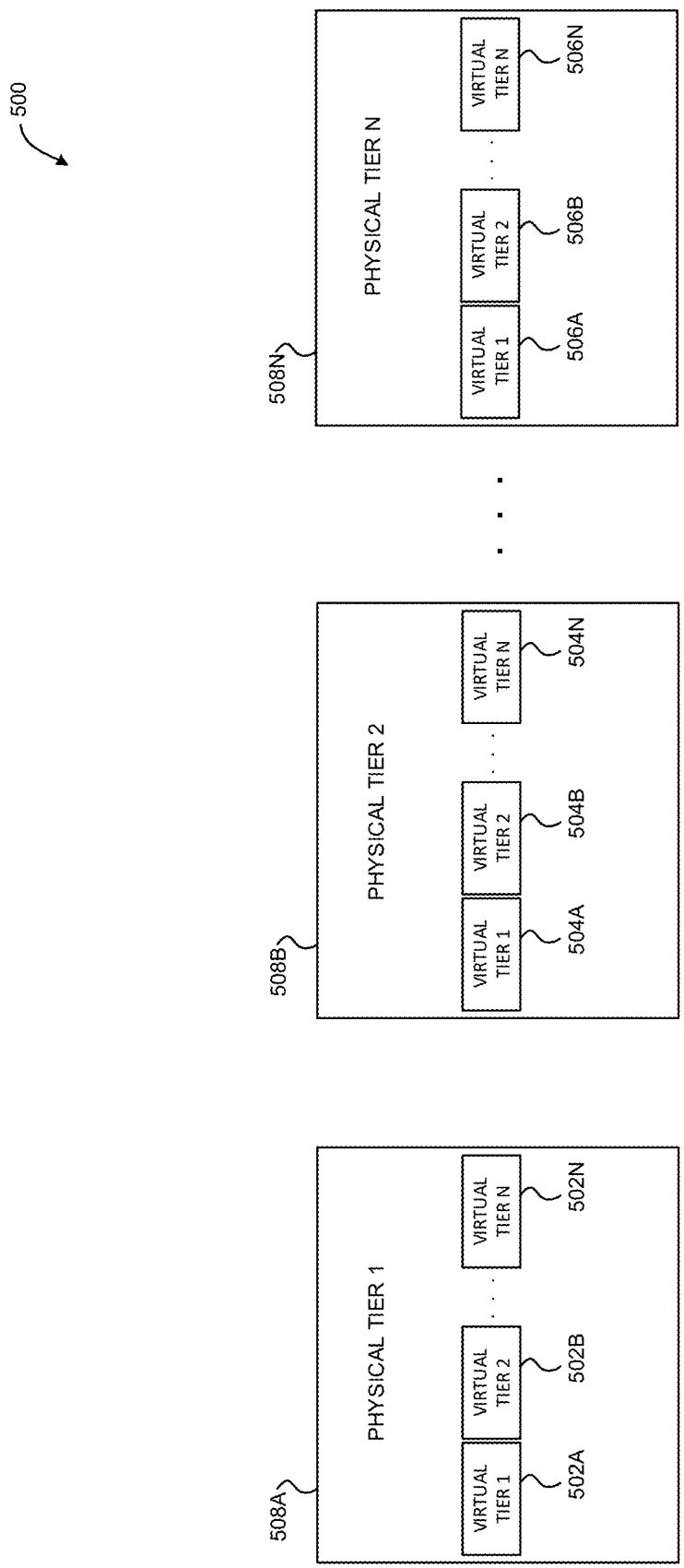
FIG. 5 illustrates an exemplary storage system that implements a plurality of virtual storage tiers, in accordance with one embodiment.

FIG. 5 illustrates an exemplary storage system 500 that implements a plurality of virtual storage tiers 502A-N, 504A-N, and 506A-N. As shown in FIG. 5, the exemplary storage system 500 is divided into a plurality of physical storage tiers 508A-N. In one embodiment, the exemplary storage system 500 may include a plurality of different storage mediums (e.g., flash storage, HDD storage, tape storage, etc.). In another embodiment, each physical storage tier 508A-N may be associated with a unique storage hardware medium.

For example, a first physical storage tier 508A may include only flash storage (e.g., all flash storage within the storage system 500, etc.). For instance, all flash storage within the storage system 500 may be logically grouped under the first physical storage tier 508A. In another example, a second physical storage tier 508B may include only HDD storage (e.g., all HDD storage within the storage system 500, etc.). For instance, all HDD storage within the storage system 500 may be logically grouped under the second physical storage tier 508B. In yet another example, an Nth physical storage tier 508N may include only tape storage (e.g., all tape storage within the storage system 500, etc.). For instance, all tape storage within the storage system 500 may be logically grouped under the Nth physical storage tier 508N.

Additionally, a plurality of virtual storage tiers 502A-N, 504A-N, and 506A-N within each of the physical storage tiers 508A-N. For example, a plurality of virtual storage tiers 502A-N are defined within the first physical storage tier 508A, a second plurality of virtual storage tiers 504A-N are defined within the second physical storage tier 508B, and a plurality of virtual storage tiers 506A-N are defined within the Nth physical storage tier 508N.

Further, in one embodiment, each of the plurality of virtual storage tiers 502A-N, 504A-N, and 506A-N may be associated with a unique predetermined compression algorithm. For example, a first virtual storage tier 502A may be associated with a first compression algorithm, a second virtual storage tier 502B may be associated with a second compression algorithm different from the first compression algorithm, etc.

Further still, in one embodiment, a first virtual storage tier 502A may utilize a first compression algorithm that has a faster compression speed and results in a lower latency when compared to a second compression algorithm utilized by a second virtual storage tier 502B. As a result, data may be accessed faster when stored in the first virtual storage tier 502A (e.g., since such data is compressed utilizing the first compression algorithm) than when it is stored in the second virtual storage tier (e.g., since such data is compressed utilizing the second compression algorithm).

Also, in one embodiment, a second virtual storage tier 502B may utilize a first compression algorithm that has a larger compression ratio and results in a smaller compressed file size when compared to a first compression algorithm utilized by a first virtual storage tier 502A. As a result, data may be stored in a smaller compressed size when it is stored in the first second storage tier 502A (e.g., since such data is compressed utilizing the second compression algorithm) than when it is stored in the first virtual storage tier (e.g., since such data is compressed utilizing the first compression algorithm).

As a result, in one embodiment, the first virtual storage tier 502A may be identified as offering faster data access, but lower storage efficiency, when compared to the second virtual storage tier 502B.

In addition, in one embodiment, a request to store data within the storage system 500 may be received. In response to the request, characteristics of the data may be identified and compared to one or more thresholds associated with the plurality of physical storage tiers 508A-N as well as the virtual storage tiers 502A-N, 504A-N, and 506A-N. In another embodiment, the data may be placed in one of the virtual storage tiers 502A-N, 504A-N, and 506A-N within one of the physical storage tiers 508A-N, based on the comparison.

For example, a first physical storage tier 508A may be associated with a first threshold, such that data having an age of less than 30 days is stored within the first physical storage tier 508A. In another example, a second physical storage tier 508B may be associated with a second threshold, such that data having an age greater than 30 days but less than 120 days is stored within the second physical storage tier 508B. In yet another example, an Nth physical storage tier 508N may be associated with a third threshold, such that data having an age greater than 120 days is stored within the Nth physical storage tier 508N.

Additionally, within the second physical storage tier 508B, a first virtual storage tier 504A may be associated with a fourth threshold, such that data having an age greater than 30 days but less than 60 days is stored within the first virtual storage tier 504A. Also, within the second physical storage tier 508B, a second virtual storage tier 504B may be associated with a fifth threshold, such that data having an age greater than 60 days but less than 90 days is stored within the second virtual storage tier 504A. Further, within the second physical storage tier 508B, an Nth virtual storage tier 504N may be associated with a sixth threshold, such that data having an age greater than 90 days is stored within the Nth virtual storage tier 504N.

Furthermore, in one example, if the identified characteristics of the data indicate that the data has an age of 65 days, the data may be stored within the second virtual storage tier 504B of the second physical storage tier 508B in response to meeting the second threshold and the fifth threshold. For example, the data may be compressed using a compression algorithm associated with the second virtual storage tier 504B and may be stored within the second physical storage tier 508B.

In one embodiment, the data may be monitored and may be automatically moved between the plurality of virtual storage tiers 502A-N, 504A-N, and 506A-N, based on one or more criteria. For example, if an age of stored data increases from 65 to 91 days, the data may no longer meet the fifth threshold, but may meet the second and sixth thresholds. As a result, within the second physical storage tier 508B, the data may be decompressed using the compression algorithm associated with the second virtual storage tier 504B, and may be recompressed using the compression algorithm associated with the Nth virtual storage tier 504N.

Further still, in one embodiment, the compression algorithm associated with the second virtual storage tier 504B may a smaller compression ratio, but faster decompression speed, when compared to the compression algorithm associated with the Nth virtual storage tier 504N. In this way, as data ages, it may be stored utilizing a compression algorithm that focuses on minimizing required storage space.

Also, in one embodiment, a dynamic lookup table may be used to determine a suitable compression algorithm based on an age of data. Table 1 illustrates an exemplary dynamic lookup table, in accordance with one embodiment. Of course, it should be noted that the exemplary dynamic lookup table shown in Table 1 are set forth for illustrative purposes only, and thus should not be construed as limiting in any manner.

TABLE 1

| ALGORITHM | AGE OF FILE (S) | COMPRESSION RATIO | COMPRESSION SPEED (MB/s) | DECOMPRESSION SPEED (MB/s) |
|---|---|---|---|---|
| 1 | <30 days | 2.101 | 625 | 3220 |
| 2 | 30-45 days | 2.091 | 480 | 1550 |
| 3 | 45-90 days | 2.238 | 510 | 600 |
| 4 | 90-120 days | 2.708 | 320 | 375 |

In this way, virtual storage tiers may be automatically implemented within physical tiers of a storage system, which may increase a storage efficiency as well as a performance of the storage system, while reducing administrative overhead. Additionally, one or more predetermined criteria may be applied (e.g., according to a policy, etc.) in order to select a compression algorithm for data within the storage system. This may achieve low latency for some predetermined data (e.g., warm data having a high probability of access), and may achieve a high compression ratio for other predetermined data (e.g., cold data having a low probability of access). Further, data may be automatically moved between virtual storage tiers as the characteristics of the data change over time. Further still, an additional virtual storage tier may be automatically implemented within the storage system when a new compression algorithm is introduced/implemented within the storage system.

Figure 6:
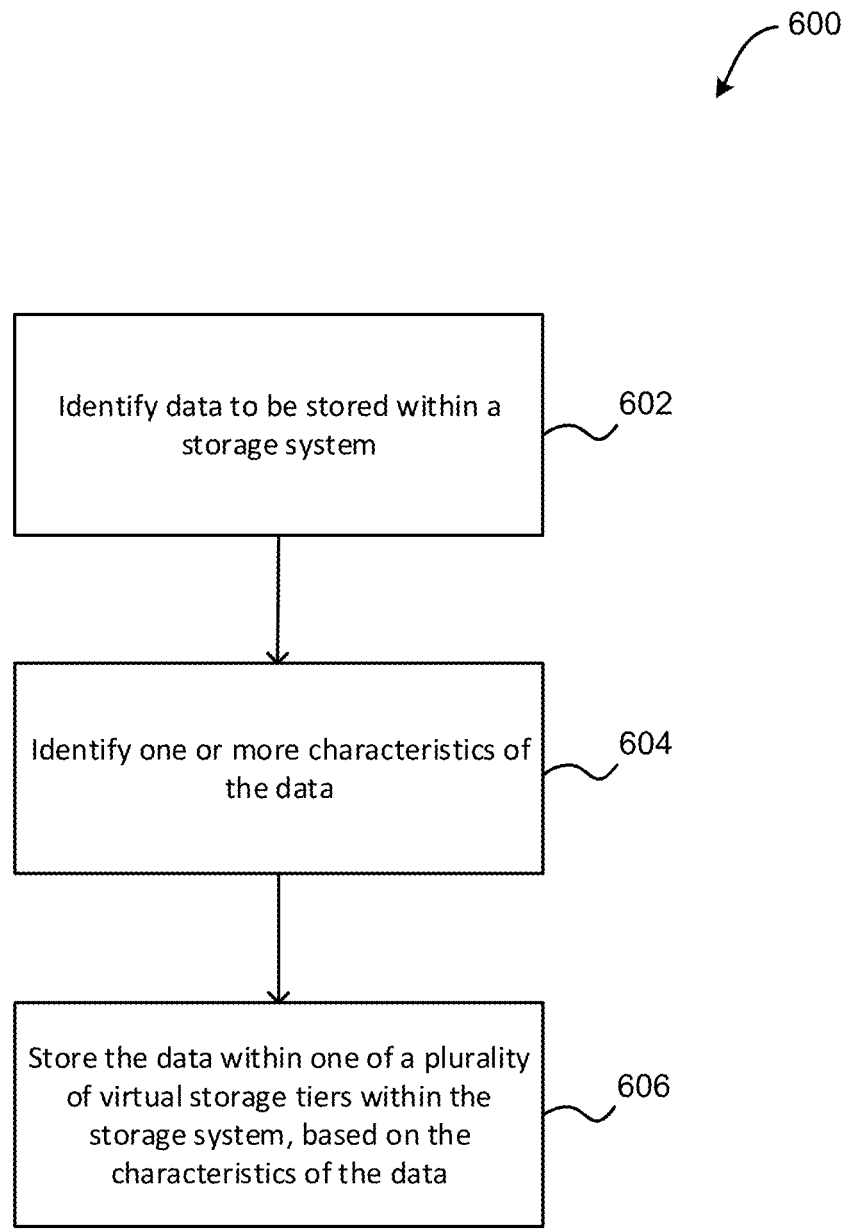
FIG. 6 illustrates a method for storing data within a tiered storage system utilizing virtual storage tiers, in accordance with one embodiment.

Now referring to FIG. 6, a flowchart of a method 600 for storing data within a tiered storage system utilizing virtual storage tiers is shown according to one embodiment. The method 600 may be performed in accordance with the present invention in any of the environments depicted in FIGS. 1-3 and 5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where data to be stored within a storage system is identified. Additionally, method 600 may proceed with operation 604, where one or more of the characteristics of the data are identified. Further, method 600 may proceed with operation 606, where the data is stored within one of a plurality of virtual storage tiers within the storage system, based on the characteristics of the data.

In one embodiment, the storage system may include a plurality of physical storage tiers. In another embodiment, each of the plurality of physical storage tiers may include a plurality of virtual storage tiers. In yet another embodiment, each of the plurality of virtual storage tiers may implement a unique compression algorithm to store data within its associated physical storage tier.

Additionally, in one embodiment, the one or more of the characteristics of the data may include a temperature of the data. For example, if the data includes "hot" data (e.g., data that has been accessed within a predetermined amount of time), the data may be stored in a first virtual storage tier utilizing a first compression algorithm having a decompression speed faster than a second compression algorithm utilized by a second virtual storage tier.

In another example, if the data includes "cold" data (e.g., data that has not been accessed within a predetermined period of time), the data may be stored in a second virtual storage tier utilizing the second compression algorithm having a decompression speed slower than the first compression algorithm utilized by the first virtual storage tier, but having a compression ratio greater than the first compression algorithm.

Further, in one embodiment, the data may be stored within one of the plurality of virtual storage tiers within the storage system by compressing the data utilizing the compression algorithm associated with the one of the plurality of virtual storage tiers. In another embodiment, once the data is compressed, the data may be stored within the physical storage tier in which the one of the plurality of virtual storage tiers is located.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying data stored within a first virtual storage tier of a storage system in response to a request for the data;
    analyzing one or more characteristics of the data, including a temperature of the data indicating an amount of time since the data was last accessed;
    in response to determining that the temperature of the data is below a predetermined threshold, identifying a second virtual storage tier having predetermined storage criteria including a predetermined data temperature matching the temperature of the data, where the second virtual storage tier utilizes a second compression algorithm having a higher compression ratio and a slower compression and decompression speed than a first compression algorithm of the first virtual storage tier;
    decompressing the data in the first virtual storage tier, using the first compression algorithm of the first virtual storage tier;
    moving the data to the second virtual storage tier of the storage system, where the first virtual storage tier and the second virtual storage tier are both located within a single physical storage tier; and
    recompressing the data in the second virtual storage tier, using the second compression algorithm of the second virtual storage tier.

2. The computer-implemented method of claim 1, wherein:
    the compression ratio, the compression speed, and the decompression speed of the first compression algorithm and the second compression algorithm are stored in association with the first virtual storage tier and the second virtual storage tier, respectively; and
    the analyzing includes:
        determining whether the one or more characteristics of the data have changed since the data was assigned to the first virtual storage tier,
        where for each virtual storage tier within the storage system, the predetermined storage criteria for the virtual storage tier is linked to an identifier of the virtual storage tier and includes characteristics of data to be stored within the virtual storage tier.

3. The computer-implemented method of claim 1, wherein the predetermined storage criteria of the second virtual storage tier further includes a predetermined data age, a predetermined data importance, and a predetermined data security level.

4. The computer-implemented method of claim 1, wherein the characteristics of the data further include:
    a current age of the data;
    a current type of the data;
    a current security level of the data;
    a current importance of the data; and
    a domain of the data.

5. The computer-implemented method of claim 1, wherein the analyzing includes determining whether the one or more characteristics of the data have changed since the data was assigned to the first virtual storage tier.

6. The computer-implemented method of claim 1, wherein the data is transferred from the first virtual storage tier to the second virtual storage tier in response to receiving a write request for the data.

7. The computer-implemented method of claim 1, wherein the predetermined storage criteria is stored in a lookup table and is referenced during the analyzing.

8. The computer-implemented method of claim 1, wherein the data is not transferred from the first virtual storage tier to the second virtual storage tier in response to determining that the one or more characteristics of the data have not changed since the data was assigned to the first virtual storage tier.

9. The computer-implemented method of claim 1, wherein the data is transferred from the first virtual storage tier to the second virtual storage tier in response to receiving a modify request for the data.

10. The computer-implemented method of claim 1, wherein the data is transferred from the first virtual storage tier to the second virtual storage tier in response to receiving a read request for the data.

11. The computer-implemented method of claim 1, wherein the one or more characteristics of the data include metadata, and further comprising updating the metadata to indicate that the second virtual storage tier is a current storage tier for the data.

12. The computer-implemented method of claim 1, further comprising:
    flagging the data, and
    moving the data to the second virtual storage tier of the storage system in response to determining that a predetermined amount of data within the storage system is flagged.

13. The computer-implemented method of claim 1, wherein the data is scheduled to be transferred from the first virtual storage tier to the second virtual storage tier, and is transferred when the data is next accessed.

14. The computer-implemented method of claim 13, wherein when the data is next accessed, the data is automatically decompressed using the first compression algorithm, and is automatically recompressed using the second compression algorithm when the next access is completed.

15. The computer-implemented method of claim 1, further comprising:
    flagging the data, and
    moving the data to the second virtual storage tier of the storage system in response to determining that the data has been accessed.

16. A computer program product for tiering data compression within a storage system, the computer program product comprising a computer readable storage medium having program instructions embodied therewith, wherein the computer readable storage medium is not a transitory signal per se, the program instructions executable by a processor to cause the processor to perform a method comprising:
    identifying, by the processor, data stored within a first virtual storage tier of the storage system in response to a request for the data;
    analyzing, by the processor, one or more characteristics of the data, including a temperature of the data indicating an amount of time since the data was last accessed;
    in response to determining that the temperature of the data is below a predetermined threshold, identifying, by the processor, a second virtual storage tier having predetermined storage criteria including a predetermined data temperature matching the temperature of the data, where the second virtual storage tier utilizes a second compression algorithm having a higher compression ratio and a slower compression and decompression speed than a first compression algorithm of the first virtual storage tier;

decompressing, by the processor, the data in the first virtual storage tier, using the first compression algorithm of the first virtual storage tier;

moving, by the processor, the data to the second virtual storage tier of the storage system, where the first virtual storage tier and the second virtual storage tier are both located within a single physical storage tier; and recompressing, by the processor, the data in the second virtual storage tier, using the second compression algorithm of the second virtual storage tier.

17. A system, comprising:

a processor; and logic integrated with the processor, executable by the processor, or integrated with and executable by the processor, the logic being configured to:

identify data stored within a first virtual storage tier of a storage system in response to a request for the data;

analyze one or more characteristics of the data, including a temperature of the data indicating an amount of time since the data was last accessed;

in response to determining that the temperature of the data is below a predetermined threshold, identify a second virtual storage tier having predetermined storage criteria including a predetermined data temperature matching the temperature of the data, where the second virtual storage tier utilizes a second compression algorithm having a higher compression ratio and a slower compression and decompression speed than a first compression algorithm of the first virtual storage tier;

decompress the data in the first virtual storage tier, using the first compression algorithm of the first virtual storage tier;

move the data to the second virtual storage tier of the storage system, where the first virtual storage tier and the second virtual storage tier are both located within a single physical storage tier; and recompress the data in the second virtual storage tier, using the second compression algorithm of the second virtual storage tier.

* * * * *